June 25, 1929.  M. J. PETERSON  1,718,304
WIND MOTOR
Filed April 11, 1928  2 Sheets-Sheet 1

Inventor
Max J. Peterson
By Clarence A. O'Brien
Attorney

June 25, 1929.  M. J. PETERSON  1,718,304
WIND MOTOR
Filed April 11, 1928    2 Sheets-Sheet 2

Inventor
Max J. Peterson
By Clarence A. O'Brien
Attorney

Patented June 25, 1929.

1,718,304

UNITED STATES PATENT OFFICE.

MAX J. PETERSON, OF PLAINVIEW, TEXAS.

WIND MOTOR.

Application filed April 11, 1928. Serial No. 269,042.

The present invention relates to improvements in wind motors and has for its principal object to provide a structure that will at all times be positive and efficient in its operation for the purpose of actuating a power take-off shaft or the like, means being provided for automatically controlling the rotation of the drive shaft of the motor.

Another important object of the invention is to provide a wind motor which includes a drum secured on a vertical drive shaft and which drum includes a plurality of angular vanes against which the wind strikes to effect the rotation of the shaft, a plurality of feathering blades being arranged around the drum and being normally held in an open position to permit the wind to pass between said blades for contact with the angular vanes of the rotatable drum, adjustable means being provided for closing the blades so that wind cannot reach the drum when the drive shaft has reached a predetermined speed of rotation. Still another object of the invention is to provide a wind motor of the above mentioned character which is simple in construction, inexpensive, strong and durable and further well adapted to the purposes for which it is designed.

Other objects and advantages will become apparent during the course of the following description.

Figure 1:
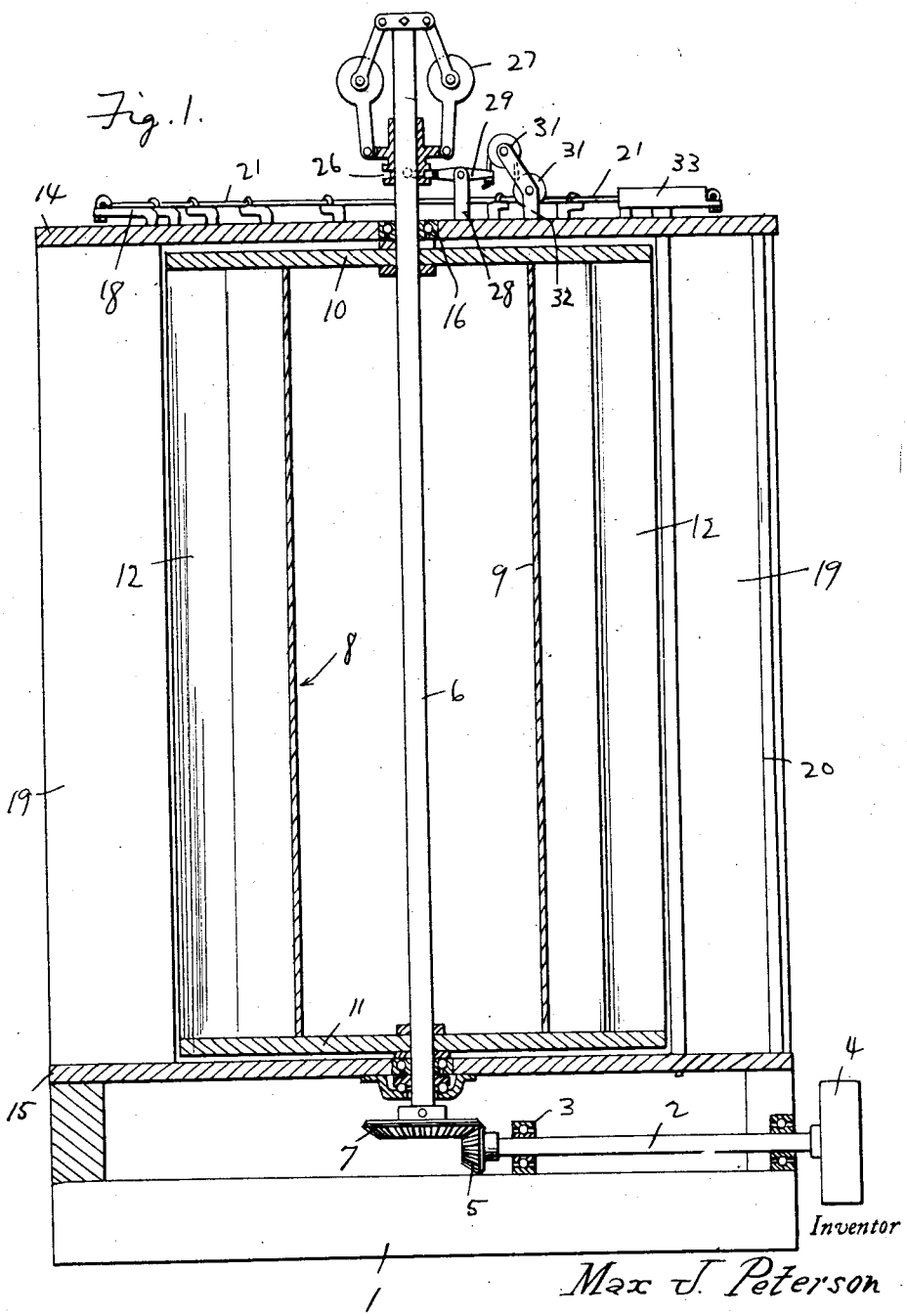
Figure 2:
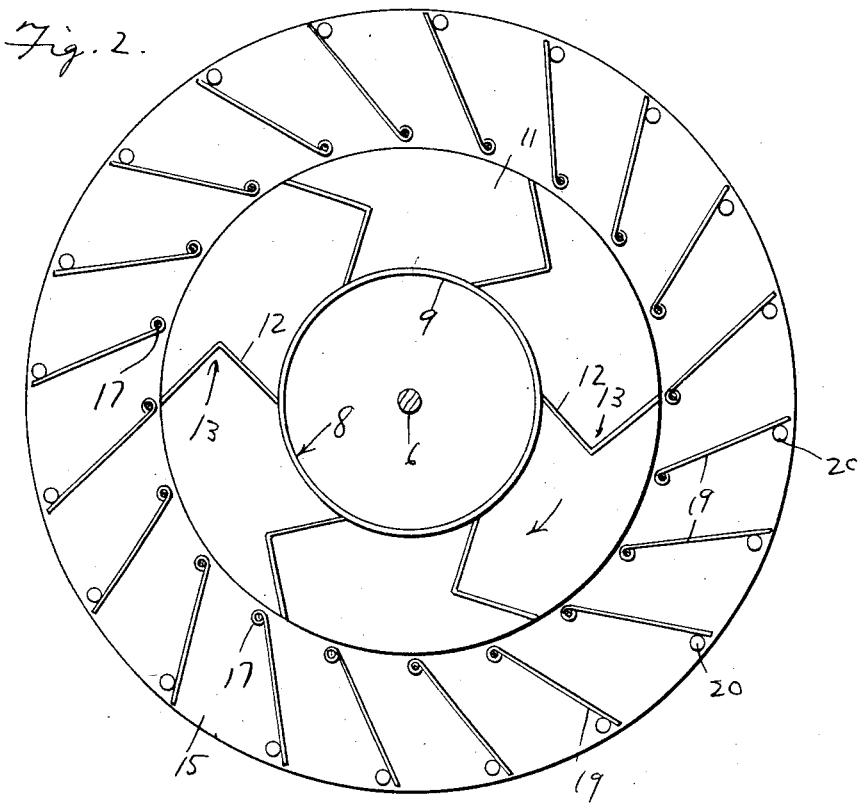
Figure 3:
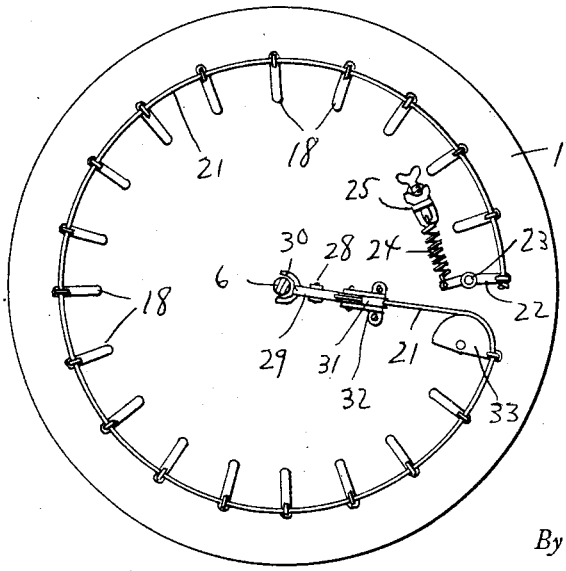

In the accompanying drawings, forming a part of this specification, and in which like numerals indicate like parts throughout the same:

Figure 1 is a vertical sectional view through the wind motor embodying my invention, Figure 2 is a top plan view, the upper disk for the feathering blades being removed, and Figure 3 is a top plan view without the governor showing the mechanism for actuating the feathering blades.

In the drawings wherein for the purpose of illustration is shown the preferred embodiment of my invention the numeral 1 designates a suitable base on which is supported the transverse driven or power take-off shaft 2, suitable bearings 3 being provided for the shaft as indicated in Figure 1. A pulley wheel 4 is secured on the outer end of this driven shaft whereby the same may be connected up to any suitable machinery to be driven while carried by the inner end of the transversely disposed or power takeoff shaft is the beveled pinion 5 the purpose of which will be presently described. A vertical drive shaft 6 is arranged above the base 1 and carried by the lower end of this drive shaft is the bevel gear 7 that meshes with the bevelled pinion 5 for operatively connecting the drive and driven shafts together. Secured on the vertical drive shaft 6 for rotation therewith is the drum designated generally by the numeral 8, the same comprising a cylindrical shell 9 that encloses the intermediate portion of the shaft. A disk 10 extends across the top of this shell, a similar disk 11 extending across the bottom of the shell. These disks are of a diameter greater than the diameter of the shell and the vertical shaft extends through the disks.

Any appropriate means may be provided for securing the disks on the shaft for rotation therewith. The drum 8 further includes the provision of a series of angular vanes 12 that extend vertically between the upper and lower disks 10 and 11 and these vanes extend radially from the shell 9 as clearly indicated in Figure 2. Each vane is formed of a piece of metal that is bent along the approximate longitudinal center thereof to provide a V-shaped pocket 13. A pair of upper and lower disks 14 and 15 respectively are arranged on the shaft 6 for independent rotation with respect thereto and as is clearly shown in Figure 1, the disk 14 is disposed above the disk 10 of the drum 8 while the disk 15 is below the lower disk of the drum. Suitable bearings 16 are provided for the disks 14 and 15 and the manner in which these bearings 16 are associated with the shaft and the respective disks is also clearly illustrated in Figure 1. Each of the last mentioned disks is of a greater diameter than the disks of the drum 8. A plurality of annular spaced shafts 17 are arranged vertically between the outermost pair of disks adjacent the outer edge of the disks of the drum 8 and the lower ends of the shafts 17 are journaled through the bottom disk 15 while the upper ends of the vertical shafts 17 project through the top disk 14 and terminate in crank portions 18 that are disposed outwardly as clearly illustrated in the drawings and the purpose of these cranks will be presently described.

A vertically disposed blade 19 is secured at its inner longitudinal edge to each of the shafts 17 for swinging movement simultaneously with the rotation of said shaft and extending vertically between the disks 14 and 15 adjacent the outer edges thereof are the annular spaced rods 20 that are located between the adjacent pairs of shafts 17 as clearly shown in Figure 2 and these rods limit the swinging movement of the blades 19 in one direction. The manner in which these feathering blades cooperate with one another will also be presently described. A cable 21 is operatively connected to the outer end of each of the cranks 18 so that said shafts 17 will be actuated in unison. One end of the cable is secured to an arm 22 that is pivoted intermediate its ends as at 23 on the top of the disk 14, the other end of said arm being secured to a spring 24 which spring is attached to a bracket 25 also mounted on the top side of the disk 14 and this spring normally maintains the rotatable shaft in such a position as to hold the feathering blades 19 in an open position so that the wind or current can pass between the feathering blades and come in contact with the V-shaped pockets of the angular vanes associated with the rotatable drum that is operatively associated with the vertical drive shaft 6.

The other end of the cable is connected to a governor controlled means the specific construction of which will now be described. A vertically slidable collar 26 is mounted on the upper end portion of the drive shaft 6 and a speed governor 27 of the conventional construction is also formed on the upper end of the drive shaft for association with the collar 26 as clearly indicated in Figure 1. A bracket 28 extends upwardly from the top of the disk 14 and supported intermediate its ends on the upper end of this bracket is a lever 29. The inner end of the lever is formed with a yoke 30 that is operatively connected with the collar 26 as clearly shown in Figure 1. The cable is secured to the outer end of the lever and is trained over suitable pulleys 31 mounted in a suitable bracket 32 also secured on the upper side of the disk 14 and an additional guide 33 is arranged on the top side of the disk 14 in the manner as shown in Figure 3. When the parts are arranged as shown in Figure 2, it will be observed that the feathering blades 19 are open and are disposed against the stop rods 20 and thus wind may pass between the blades from any side of the structure to enter the V-shaped pockets 13 of the angular blades or vanes 12 so that said vanes will effect a rotation of the drum 8 and the drive shaft 6 carried thereby and this movement of the shaft 6 will actuate the power takeoff or driven shaft 2 by reason of the intermeshing gears 5 and 7.

When the shaft 6 has reached a predetermined speed of rotation, the governor 27 will automatically move the collar 26 upwardly so that the outer end of the lever 29 will swing downwardly and this will result in the cable 21 being actuated to move the crank 18 in one direction whereby to slowly rotate the shafts 17 and effect a closing of the feathering blades in overlapping relation with respect to each other. This will cut off communication between the atmosphere and the rotatable drum and when the speed of the drive shaft has reduced, the governor 27 will again move the collar 26 downwardly and the spring 24 will actuate the cranks 18 to open the blades to the position shown in Figure 2.

It will thus be seen from the foregoing description, that I have provided a wind motor which will at all times be positive and efficient in its operation and due to the provision of the governor and the cable for controlling the opening and closing of the feathering blades, the supply of air current to the rotatable drum will be regulated automatically depending upon the speed of rotation of the drum and the drive shaft associated therewith. A wind motor of the above mentioned character can be manufactured at a very low cost and furthermore will be strong and durable.

While I have shown the preferred embodiment of my invention, it is to be understood that various changes in the size, shape and arrangement of parts may be resorted to, without departing from the spirit of the invention and the scope of the appended claims.

What I claim is:—

1. In a wind motor, a vertical rotatable drive shaft, a wind wheel fixed thereon, upper and lower stationary disks arranged horizontally above and below the respective ends of the wind wheel, a plurality of vertically disposed shafts journaled for rotation between the disks adjacent the outer edges of the wind wheel, a blade secured to each shaft for rotation therewith, the upper ends of the blade carrying shaft extending through the top disk and terminating in cranks, a cable operatively connected to all of said cranks, a spring for connection with one end of the cable to hold the blades in an open position, a lever pivotally secured intermediate its ends on the top of the top disk and connected at its outer end to the other end of the cable, and a governor carried by the upper end of the drive shaft and being operatively connected with the inner end of the lever for actuating the cable to close the blades.

2. In a wind motor, a vertical rotatable drive shaft, a wind wheel fixed thereon, upper and lower stationary disks arranged horizontally above and below the respective ends of the wind wheel, a plurality of vertically disposed shafts journaled for rotation between the disks adjacent the outer edges of the wind wheel, a blade secured at its inner edge to each shaft, for rotation therewith, the upper ends of the blade carrying shaft extending through the top disk and terminating in cranks, a cable operatively connected to all of said cranks, a spring for connection with one end of the cable to hold the blades in an open position, a lever pivotally secured intermediate its ends on the top of the top disk and connected at its outer end to the other end of the cable, and a governor carried by the upper end of the drive shaft and being operatively connected with the inner end of the lever for actuating the cable to close the blades, and rods extending vertically between said disks at the outer edges thereof forming stops for the respective blades.

In testimony whereof I affix my signature.

MAX J. PETERSON.